(12) United States Patent
de Groot

(10) Patent No.: US 8,110,133 B2
(45) Date of Patent: Feb. 7, 2012

(54) METHOD FOR MANUFACTURING A COMPOSITE CONSTRUCTION ELEMENT

(75) Inventor: Martin Theodoor de Groot, Driebergen (NL)

(73) Assignee: FITS Holding B.V., Driebergen (NL)

( * ) Notice: Subject to any disclaimer, the term of this patent is extended or adjusted under 35 U.S.C. 154(b) by 395 days.

(21) Appl. No.: 12/299,883

(22) PCT Filed: May 7, 2007

(86) PCT No.: PCT/NL2007/000120
§ 371 (c)(1),
(2), (4) Date: Nov. 6, 2008

(87) PCT Pub. No.: WO2007/129885
PCT Pub. Date: Nov. 15, 2007

(65) Prior Publication Data
US 2009/0115097 A1 May 7, 2009

(30) Foreign Application Priority Data
May 8, 2006 (NL) ..................... 1031769

(51) Int. Cl.
*B29C 70/00* (2006.01)
(52) U.S. Cl. ............... 264/241; 264/258; 264/319
(58) Field of Classification Search ........... 264/241, 264/258, 319
See application file for complete search history.

(56) References Cited

U.S. PATENT DOCUMENTS

| | | | |
|---|---|---|---|
| 3,192,099 A | | 6/1965 | Beckman et al. |
| 3,647,590 A | * | 3/1972 | Wolf .............. 156/211 |
| 3,687,170 A | * | 8/1972 | Malone et al. .......... 138/143 |
| 5,032,443 A | * | 7/1991 | Rietdijk et al. .......... 428/121 |
| 5,547,737 A | | 8/1996 | Evans et al. |
| 5,562,791 A | * | 10/1996 | De Groot ................ 156/79 |
| 5,683,781 A | | 11/1997 | Komarek et al. |

FOREIGN PATENT DOCUMENTS

| | | |
|---|---|---|
| DE | 38 13 104 A1 | 11/1989 |
| DE | 195 15 930 A1 | 11/1996 |
| DE | 196 12 127 A1 | 10/1997 |
| DE | 197 15 529 C1 | 8/1998 |
| DE | 297 12 684 U1 | 11/1998 |
| EP | 0 431 669 A1 | 6/1991 |
| EP | 0 636 463 A1 | 2/1995 |

(Continued)

OTHER PUBLICATIONS

Search Report dated Mar. 29, 2007 for NL 1031769.

(Continued)

*Primary Examiner* — Joseph Del Sole
*Assistant Examiner* — James Sanders
(74) *Attorney, Agent, or Firm* — Thomas, Kayden, Horstemeyer & Risley, LLP

(57) ABSTRACT

A method for producing a composite construction element is disclosed. In one embodiment, the method includes the steps of:
a) providing a composite construction element, which comprises a thermoplastic core layer between two fiber-reinforced thermoplastic cover layers;
b) providing one or more interruptions in a fiber-reinforced thermoplastic cover layer of the panel;
c) positioning a fiber-reinforced thermoplastic reinforcing layer over and/or near the interruption;
d) deforming at least the edges situated along the interruption and, if desired, the thermoplastic reinforcing layer, preferably while simultaneously locally compacting the core layer, so that a thermoplastic construction element having a recess which is delimited by fiber-reinforced thermoplastic walls is obtained.

23 Claims, 4 Drawing Sheets

FOREIGN PATENT DOCUMENTS

| | | | |
|---|---|---|---|
| FR | 2 339 473 A1 | | 8/1977 |
| GB | 1 032 707 A | | 6/1966 |
| GB | 1 274 569 A | | 5/1972 |
| GB | 2 057 959 A | | 4/1981 |
| GB | 2 151 184 A | | 7/1985 |
| JP | 53137274 A | * | 11/1978 |
| JP | 59 007014 A | | 1/1984 |
| NL | 7 000 282 A | | 7/1970 |
| WO | 97/03828 A | | 2/1997 |
| WO | 01/56780 A1 | | 8/2001 |

OTHER PUBLICATIONS

PCT Search Report dated Oct. 4, 2007.

* cited by examiner

METHOD FOR MANUFACTURING A COMPOSITE CONSTRUCTION ELEMENT

This application is the National State of International Application no. PCT/NL2007/000120 filed May 7, 2007, which claims the benefit of Netherlands patent application number 1031768 filed May 8, 2006, the contents of which are incorporated by reference herein.

FIELD OF THE INVENTION

The present invention generally relates to a method for reinforcing and deforming a composite construction element, such as a composite panel, beam or the like, in particular having a thermoplastic sandwich structure, and to objects of this type.

BACKGROUND OF THE INVENTION

European patent 431669 discloses a method for manufacturing an object from a thermoplastic sandwich material, in which the normals of at least two surfaces of this object form an angle with respect to one another. This known method comprises at least the steps of softening a part of one of the surfaces of the thermoplastic sandwich material over a distance which corresponds to at least the length of an imaginary folding line of the angle between the two surfaces with the aid of a stamp, in which the stamp is at least partially pressed into the top layer of the thermoplastic sandwich material, and of folding the two surfaces of the thermoplastic material about the folding line, in such a manner that the surface which has been softened thus comes to lie on the inside of the angle.

By means of this method, an object with two surfaces at an angle to one another is produced, in which the excess material of the softened top layer of the sandwich material is present on the inside of the angle, and is melted in the foam core in the folded state. Thus, the excess material is prevented from bulging outwards, which could result in an unsatisfactory fold or angle.

WO 01/56780 describes a method and device for closing and finishing an open end of a panel, which usually comprises a set of thermoplastic cover layers or skins arranged at a distance from one another, which are connected to one another by ribs which extend in the length direction. A panel of this type thus comprises chambers through which a desired material may flow. With this known method, a projecting part of one of the cover layers is folded towards the other cover layer and connected thereto, for example by means of hot-welding, etc.

In the field, there is a general need for deforming methods for usually flat composite construction elements, such as sandwich panels, in which the positions of deformation are reinforced. More particularly, there is a need for such elements that have surfaces which are at an angle to one another, in which the angle is reinforced further. In a similar manner, there is also a need in the field for such elements with edges which have been reinforced. There is also a need to prevent the use of inserts in such panels, especially along the edges.

SUMMARY OF THE INVENTION

Generally, it is an object of the invention to satisfy these needs and/or to provide a usable alternative.

To this end, the method for producing a composite construction element according to the invention comprises the steps of:

a) providing a composite construction element, which comprises a thermoplastic core layer with at least one fiber-reinforced thermoplastic cover layer;
b) providing an interruption in the fiber-reinforced thermoplastic cover layer of the element;
c) positioning a fiber-reinforced thermoplastic reinforcing layer over and/or near the interruption;
d) deforming at least the edges situated along the interruption, so that a construction element having a recess which is at least partially delimited by fiber-reinforced thermoplastic walls is obtained.

In the method according to the invention, a composite construction element, such as a panel, is used as starting material which comprises a thermoplastic core layer with at least one fiber-reinforced thermoplastic cover layer. The core layer has a structure which is not solid, such as a thermoplastic foam or a thermoplastic honeycomb structure. Preferably, the composite construction element has a sandwich structure in which the core layer is arranged between two cover layers, of which at least one cover layer is a fiber-reinforced thermoplastic cover layer. More preferably, an element with a thermoplastic sandwich structure, in particular an in-situ manufactured sandwich structure, is used. In a next step of the method according to the invention, an interruption is provided in one of the fiber-reinforced thermoplastic cover layers. After making, for example, incisions, with the object of locally interrupting the fiber reinforcement of the cover layer, an additional fiber-reinforced reinforcing layer with a thermoplastic matrix is provided over the interruption or near to the latter, in other words along the edge of the interruption. It will be understood that such an additional fiber-reinforced reinforcing layer may already be present in the starting panel itself below the position of the interruption to be produced. Other techniques to produce the interruption in the fiber reinforcement comprise cutting, milling, lasering or sawing. If desired, the material of the core layer situated near the interruption may be removed, thus resulting in a weight saving. In a subsequent step, these edges along the interruption are deformed by applying pressure with the addition of heat, for example at a temperature in the range of the melting point ±20%, by folding these edges in the direction towards the other cover layer, for example with the aid of a hot molding stamp, so that the foam situated under these edges, if it is still present, is compacted and at the same time a bond between the thermoplastic in the fiber-reinforced reinforcing layer and the thermoplastic in the fiber-reinforced cover layer and the thermoplastic of the core layer is produced, and a recess is formed. Usually, the additional fiber-reinforced reinforcing layer will also be deformed in this step. The recess has an at least partially fiber-reinforced bottom and/or walls, formed by the bent edges of the incision and/or reinforcing layer. The shape and the depth of the recess can be selected as desired. Advantageously, the recess extends up to the other cover layer. If the core layer material has not been removed after the interruption was made, only a very thin layer of compacted (in this case essentially solid) core layer material is present. The dimensions of the reinforcing layer used are matched to the recess to be formed. Interrupting the cover layer and deforming the edge sections adjacent to the interruption opens the way for the production of construction elements of great diversity in terms of deformations, such as will be explained below with reference to examples.

The term "interruption" in this context denotes an interruption of the fiber structure of the fiber-reinforced thermoplastic cover layer. An interruption of this type may be produced by means of any kind of tool, such as e.g. a knife, laser, cutter or saw.

In the present description, the term "composite construction element" denotes an object which is composed of a thermoplastic core layer and at least one fiber-reinforced thermoplastic cover layer. Such an element having a "sandwich structure" defines an object which is composed of a thermoplastic core layer which is arranged between two cover layers, at least one of which is thus a fiber-reinforced thermoplastic cover layer. The other cover layer may be made of, for example, metal or fiber-reinforced metal laminate, such as Glare. A "thermoplastic sandwich structure" is composed of a thermoplastic core layer and two fiber-reinforced thermoplastic cover layers. Such an element with an "in-situ manufactured sandwich structure" denotes an element of this type, which has been produced by means of the in-situ foaming technique, in other words a thermoplastic foam layer which has been foamed in situ and is arranged between two fiber-reinforced thermoplastic cover layers. This technique is known, inter alia, from EP-A-636463 by the Applicant, as will be described below. Because of their favorable strength and weight properties, such construction elements having an in-situ manufactured sandwich structure are particularly suitable for use in the transport sector, such as in aviation and space travel.

In the context of this description, the term "panel" denotes an object having a thickness which is small compared to the length and width thereof.

The core layer is not solid, for example a thermoplastic foam or a thermoplastic honeycomb. This honeycomb structure comprises essentially parallel open tubular elements made from a thermoplastic which are at right angles to the main surface of the fiber-reinforced thermoplastic layer, for example manufactured by means of an extrusion process. A thermosetting or thermoplastic adhesive may be used in order to connect the components. If possible, the thermoplastic which is present in the core, reinforcing layers and cover layers itself serves as bonding agent. It is also possible to use welding techniques for this purpose. Preferably, the core layer is a foam layer, in particular an in-situ foam layer.

A method for manufacturing a construction element having a sandwich structure in the form of a panel with a foam core by means of in-situ foaming is, for example, known from EP-A1-0636463, as has already been described above. The above mentioned sandwich panel consists of a foamed core layer, which is covered with two cover layers. At least one cover layer comprises one or more (fiber-reinforced) thermoplastic materials. The in-situ foaming process comprises various steps. The first step is an assembly step, during which a core web, which comprises at least one film made of a thermoplastic material, which material contains a certain amount of a suitable physical blowing agent (swelling agent, solvent), is positioned between, for example, two (fiber-reinforced) cover layers, which are usually made of the same thermoplastic material as the core web. Subsequently, the assembly of core web and cover layers is placed between two press platens in a press. In this position, a foaming step is performed, in which heat and pressure are added to the assembly via the press, so that the core web starts to foam and a connection between the latter and the cover layer or cover layers is produced at the same time. During this foaming step, when the temperature has reached a sufficiently high level, the press is slowly opened, as a result of which the distance between the two press platens increases. This allows the physical blowing agent (swelling agent, solvent) to expand, as a result of which the material of the core web starts to foam. This expansion is usually carried out under controlled conditions. In this way, the core web is foamed, and the connection between the core web and the cover layer or layers is produced in one manufacturing step without a separate or additional adhesive being required. Once a predetermined thickness of the foamed core web has been achieved, the assembly is allowed to cool off during a cooling step. The product obtained in this way comprises the foamed core web which is covered by two cover layers and connected thereto. In addition, a drying step is also usually carried out.

Examples of swelling agents for a core layer comprising thermoplastic foam include acetone, methyl ethyl ketone, methyl acetate, methyl propionate, nitro ethane, cyclohexane, ether, ethanol, methanol and pentane, as well as mixtures, such as ethanol/acetone and methanol/methyl acetate. Acetone is a preferred swelling agent. It is also possible to use, for example, chemical blowing agents and an inert gas as foaming agent. Examples of suitable thermoplastics for the core layer and the matrix for the fiber-reinforced cover layer comprise polyetherimide (PEI), polyethersulfone (PES), polysulfone, polyphenylsulfone (PPSU), polyketone, such as polyetherether ketone (PEEK), liquid crystal polymers, polycarbonate (PC), propylene (PP), polyvinyl chloride (PVC), polyethylene (PE), etc., as well as combinations thereof. Polyetherimide is a preferred thermoplastic. The latter is available in different grades from General Electric under the brand name Ultem. Glass fibers are preferred as reinforcement. Other inorganic fibers, such as metal fibers, carbon fibers and organic fibers, such as astampide fibers, can be used in a similar manner, provided they can be deformed in order to form the reinforcing ribs. It is also possible to use natural fibers, in addition to the abovementioned synthetic fibers. The fibers can be used in the form of mats, fabrics, chopped fibers and the like. Directional fibers, in particular unidirectional fibers where the fiber direction is matched to the intended use, can also be used advantageously. The material of the core layer, preferably a foam core, may optionally be reinforced with fibers of the abovementioned types or with nanoparticles. Preferably, the thermoplastic material of the core layer is the same as the thermoplastic material in the cover layers. However, it is also possible to use combinations of different thermoplastics. Suitable examples thereof include, inter alia, PEI foam covered with cover layers made of PPSU, PS, PEEK or PC, PES or PPSU foam covered with PPSU or PC cover layers, and PP foam covered with polyamide, such as nylon cover layers.

The abovementioned examples are similarly true for additional reinforcing layers. These may, for example, be used as consolidated layer or as prepreg, which may consist of several layers (laminates) which are stacked on top of one another.

If desired, the core layer may also consist of several layers, which are separated by an intermediate layer, such as e.g. an optionally fiber-reinforced (thermoplastic) layer, cestampic layer or metal layer.

The in-situ foaming technique can similarly be used for manufacturing objects having an in-situ manufactured sandwich structure having different cross sections, in which, for example, the thickness of the foam core is in the same order of magnitude as the width. By means of operations, such as sawing a panel into pieces, it is possible to manufacture therefrom objects having smaller dimensions, in which the fiber-reinforced recess according to the invention can be produced.

Other methods for manufacturing an assembly comprising a thermoplastic core layer and at least one fiber-reinforced thermoplastic cover layer include, inter alia, extruding a thermoplastic foam or thermoplastic honeycomb onto a fiber-reinforced thermoplastic cover layer, preferably between two such cover layers, and gluing a thermoplastic foam to a fiber-reinforced thermoplastic cover layer. In general, the adhesive used should be able to withstand the temperatures required for deformation.

Characteristic of the method according to the invention is the fact that the a fiber-reinforced thermoplastic cover layer is interrupted and an additional reinforcing layer is present or is provided at the interruption, following which the assembly is deformed to form a recess, which is delimited by the additional reinforced reinforcing layer and/or the original cover layer.

According to one aspect, the method according to the invention makes it possible to manufacture strong lightweight floor panels for transport means, in particular for the aviation and space travel industry. To this end, a number of parallel interruptions are produced a distance apart—if desired in several directions—in a fiber-reinforced thermoplastic cover layer, one or more reinforcing layers are applied on top thereof, if desired secured by means of ultrasonic welding, after which, in step d), the edges are deformed along the interruptions, so that a panel having a large number of parallel recesses is obtained. By suitable dimensioning, it is possible, when producing a floor, to accommodate the supporting structure, for example supporting beams thereof, in these recesses. Compared to a conventional floor structure, in which flat sandwich panels rest on the supporting structure, this results in a reduction in the floor height by the thickness of the floor panel. With regard to the airplane itself, this results not only in a reduction in weight, but also in increased height for passengers or cargo. The recesses can also be filled with filler segments having a cross-sectional shape which is complementary to the shape of the recess, preferably made of a thermoplastic sandwich structure, which is covered on the longitudinal sides with a fiber-reinforced (thermoplastic) cover layer.

The fiber-reinforced recess may also be provided in reinforcing beams, posts, struts, stamps, etc., so that the groove can be used in order to place another construction element into it, for example by means of a tongue-and-groove joining technique.

The basic steps of the method according to the invention, optionally without the step of positioning a fiber-reinforced thermoplastic reinforcing layer over and/or near the interruption, are also particularly suitable for manufacturing a construction element having a (preferably thermoplastic) sandwich structure with a reinforced angle or edge. To this end, according to a preferred method of the invention, in step a) an interruption is provided at a predetermined distance from a peripheral edge of the construction element and in step d) an intermediate element with a main body is obtained, which is separated from an edge section by a recess which extends in the thickness direction of the element, which recess is delimited by walls made of at least one fiber-reinforced thermoplastic layer; and the method furthermore comprises a step e) in which the edge section is bent with respect to the main body. In this preferred method, an interruption, such as an incision is advantageously provided parallel to and at a distance from a peripheral edge. When manufacturing an angled construction element, this distance will generally be greater than when manufacturing an element with a reinforced edge. However, for the sake of convenience, in this description, the same term edge section is used for both embodiments, although the edge section may be larger than the main body in the case of an angled element. Subsequently, the edge along the interruption and the reinforcing layer is deformed, as has been described above, resulting in an intermediate element having a recess. The shape of this recess is not limited. It is partly determined by the kind of bend or fold which is then produced in order to obtain the angle or edge. The same advantages may be achieved without the addition of the optional reinforcing layer, as the deformed cover layers of the starting materials already provide reinforcement and protection.

In a subsequent step, the edge section can then be bent or folded with respect to the main body. In a preferred embodiment of the method according to the invention, the recess extends up to the other cover layer and this other cover layer is heated up to but not above the glass transition temperature and subsequently bent to form a bend with a relatively large radius. The bent recess consisting of an uninterrupted cover layer, reinforcing layer and/or edges of the interrupted cover layer along the incision is sufficiently strong and impact-resistant to act as connecting strut, where otherwise an additional separate (metal) connecting section or a sandwich elements filled with filler (potting compound) would have to be used in order to couple elements such as plates to one another at an angle. This results in a significant weight saving. In order to produce an angled construction element, in which the angle describes a bend with a small radius, the above-described method can be followed. In this case, however, the temperature of the uninterrupted cover layer should generally be kept in the range between the glass transition temperature and the melting point during the bending step in order to locally heat the bottom cover layer to above the Tg.

Depending on the type of construction element which has to be produced, the edge section, which is separated from the non-deformed main body by the recess formed previously, can be bent. Bending can be carried out in two directions. In a first variant thereof, this step is carried out in such a manner that the walls of the recess are folded towards one another. This variant is suitable both in case an angled element, in particular with the angle being formed as a bend with a small radius, and in case an element with a reinforced edge is desired. In a second variant, the part of the cover layer in which no incision has been made is folded back at the edge section towards the main body. This second variant is particularly suitable if a construction element having a sandwich structure with a reinforced edge is desired. Subsequently, this edge section is connected to the main body, for example using a thermoplastic or thermosetting adhesive. If possible, the thermoplastic matrix in the fiber-reinforced layers may be used. The ultimate shape is advantageously fixed by means of a consolidation stamp. The exact shape of the angle or edge is also dependent on the shape of the recess and thus on the shape of the shoe of the stamp.

The angle through which the edge section is bent is not limited and can vary between an obtuse angle and a very acute angle, depending on the desired angle in the end product. In this manner, a construction element having a sandwich structure can be produced from a thermoplastic foam core covered with two thermoplastic fiber-reinforced cover layers, two surfaces of which are at an angle to one another, in which the angled section in the element is additionally reinforced. This may be particularly favorable for applications under load, such as for example in luggage compartments in an airplane.

This technique may also be used for finishing edges of a construction element having a sandwich structure. In fact, the distance between the interruption and the peripheral edge (in other words the width of the edge section) and the angle between the main body and the edge section determines whether or not an angle, or an edge, is formed. Preferably, the method according to the invention also comprises a step in which the peripheral edge of the edge section is folded while the foam layer is simultaneously compacted locally. The folded cover layers can abut one another or overlap one another. Thus, an edge or side of the edge section is obtained, which is also covered by at least one fiber-reinforced thermoplastic cover layer. In this case as well, an additional reinforcing layer can be used to reinforce the edge further. In a further preferred embodiment of the method according to the invention, the edge section is folded through 90° in step e). Preferably, the width dimension of the recess is substantially equal to the thickness of the core of the construction element, so that the interrupted cover layer of the edge section is at right angles to the main surfaces of the main body of the sandwich panel.

In yet another preferred embodiment, an edge section is rolled twice, in other words is folded back through 180° in step e). The recess is then preferably equal to the thickness of the construction element increased by the width of the edge section (distance between recess and peripheral edge, which may be finished in the way described above). It is thus possible to produce a very strong edge, without the edge being visible on the top surface, for, for example, edges of galleys and/or luggage compartments. In this case, it is also possible to add one or more reinforcing layers.

In order to fix the shape well, the method comprises a consolidation step, preferably subsequent to step e), in order to consolidate the folded edge section.

Folding of the edges is preferably carried out using a molding stamp, the molding stamp having a temperature in the range of the melting point Tm ±20% of the thermoplastic.

Preferably, the bottom cover layer is simultaneously also locally heated to a temperature which is generally higher than the glass transition temperature. To this end, a support stamp can be used having a temperature of Tg or above, but below the melting point.

The above-described angle-forming techniques and edge-finishing techniques can, in particular, be used on a sandwich panel, because of the relatively large surface dimensions thereof.

The above-described techniques can also be used for producing a hole reinforced with a fiber-reinforced thermoplastic layer or a local recess in the edge of a composite construction element, which may be used, for example, for installing an insert or the like, or as a result of which an insert and potting compound may be omitted. To this end, the cover layer is interrupted locally in order to make a round hole preferably interruptions, such as incisions with a radius corresponding to the maximum diameter of the hole to be produced in several radial directions. A (preformed) fiber-reinforced reinforcing layer is placed over this hole position and subsequently pressed into the element by means of a molding stamp. More preferably, the hole is predrilled with a view to weight saving. If desired, in particular with such a predrilled hole, the projecting peripheral edge of the reinforcing layer is completely or partially fastened to the top cover layer by means of, for example, ultrasonic spot-welding. In this way, a thermoplastic insert can be placed in the fiber-reinforced recess and secured to the fiber-reinforced recess walls with the aid of a thermosetting adhesive. Fusion of the thermoplastic of the insert and the thermoplastic of the fiber-reinforced recess walls is also possible by adding heat.

With local recesses along the edge or at corners of composite construction elements, the fiber-reinforced thermoplastic cover layer is interrupted, preferably in the direction of the edge as well as transverse to the edge, in order to allow the fiber structure used to be deformed locally to the required extent.

A reinforcing layer can extend (partially) over the existing cover layer and, if desired, be recessed into the latter by local heating.

Even if, with the above-described techniques according to the invention, the recess does not extend over the entire thickness of the sandwich panel, it is possible to produce construction elements with cutouts, in which objects of a complementary shape or cross section can be accommodated, such as boards in side walls of cupboards.

The deformation stamps and consolidation stamps which are used with the methods according to the invention may be designed in many different ways. For example, the deformation stamp may be provided with cooling means in addition to heating means, so that the deformation stamp can also be used as a consolidation stamp. Another possibility is a multi-part stamp system, comprising a shaping shoe, which can be coupled in heat-exchanging contact to either a heating block for deforming or a cooling block for consolidating. Of course, separate deformation and consolidation stamps can also be used. The stamps may be designed for securely holding and/or fastening the reinforcing layer in order to prevent displacement thereof relative to the stamp.

BRIEF DESCRIPTION OF THE DRAWINGS

The invention will be described in more detail below with reference to the attached drawing, in which.

In the figures, the invention is explained with reference to a thermoplastic sandwich panel as construction element. It will be understood that the invention is not limited to panel-shaped construction elements.

DESCRIPTION OF THE PREFERRED EMBODIMENTS

Figure 1:
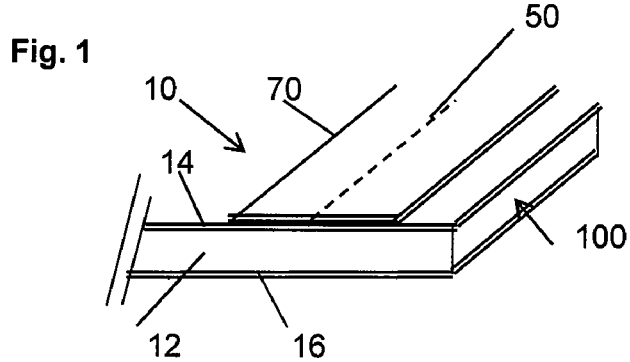
FIGS. 1-3 show a first embodiment of the method for manufacturing an angled thermoplastic sandwich panel.
Figure 2:
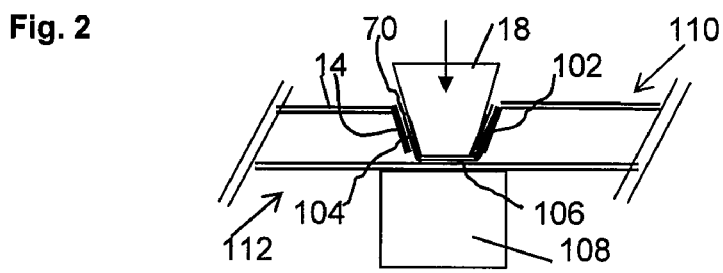
Figure 3:
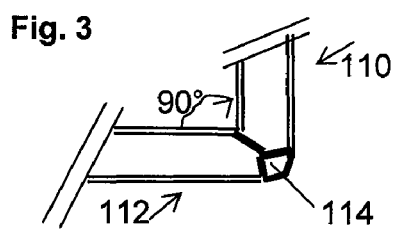

FIG. 1 shows a thermoplastic sandwich panel 10 which comprises an in-situ foamed core layer 12. Fiber-reinforced thermoplastic cover layers 14 and 16, respectively, are provided at the top of the foam core layer 12 and at the bottom thereof. In a first step, an incision 50 is made in the cover layer 14, parallel to the peripheral edge 100, following which a reinforcing layer 70 of a fiber-reinforced thermoplastic (either prepreg or consolidated laminate) is positioned in such a manner that the incision 50 is covered thereby and the reinforcement ends up in the desired spot in the end product. Subsequently, a hot molding stamp 18 is used to deform the top cover layer 14 at the location of the incision 50 and thus the edges which delimit the incision 50 are folded, with the additional reinforcing layer 70 also simultaneously being deformed and being pressed into the shape of a formed recess 102. See FIG. 2. The recess 102 is delimited by walls 104 and bottom 106, which are made of fiber-reinforced thermoplastic. The depth and shape of the recess 102 is determined by the shape of the shoe of the stamp 18. If the molding stamp is small, it may be necessary to preheat the reinforcing layer using a preheating stamp which is usually flat. The underside of the sandwich panel 12 in this case rests on a support stamp 108, the temperature of which is kept near or above the glass transition temperature in order to facilitate deformation in the subsequent steps, depending on the shape which is to be produced, for example for an angle with a small radius, the bottom layer has to be locally deformable and the temperature is kept in the range between the glass transition temperature and the melting point. If an angle with a large radius is to be produced, the temperature has to be kept below the Tg in order to use the rigidity of the bottom cover layer for the deformation. Thus, a recess 102 is formed which, in the embodiment illustrated in FIG. 2, extends from the top cover layer 14 up to the bottom cover layer 16 in the thickness direction of the sandwich panel 10. The shaped walls 104 of the recess 102, either straight or inclined or a combination of both or of another shape, consist of a fiber-reinforced thermoplastic layer which is made from the additional reinforcing layer 70 or the folded edges of the top cover layer 14 adjoining the incision 50 or both. This recess 102 separates the main body 112 of the sandwich panel 10 from the edge section 110. In a subsequent folding step which is illustrated in FIG. 3, the edge section 110 is folded further through an angle of 90°, so that the normals of the surfaces of the main body 112 and the edge section 110, respectively, enclose of an angle of 90°. The formed angle is thus reinforced with additional fiber-reinforced thermoplastic material. In the embodiment illustrated in FIG. 2, a conical deformation stamp 18 is used. If a V-shaped stamp is used, a connection can be achieved in which the thermoplastic layers are directly connected to one another without open space when they are folded. In the embodiment shown in FIG. 3, the open space 114 may, if desired, be filled with a suitable filler material, or several reinforcing layers for deformation may locally be added.

Figure 4:
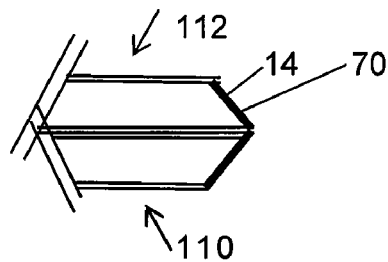
FIGS. 4-5 show two other thermoplastic sandwich panels with different edge finishes.
Figure 5:
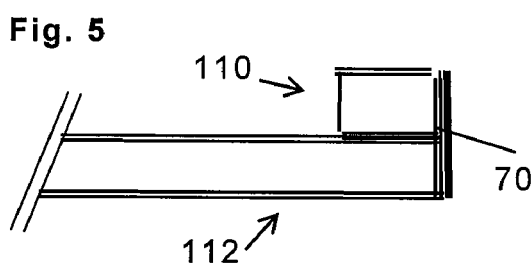
Figure 6:
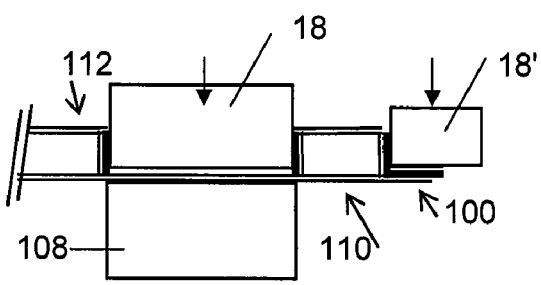
FIGS. 6-8 show an embodiment of a method according to the invention for producing a thermoplastic sandwich panel with a finished edge.
Figure 7:
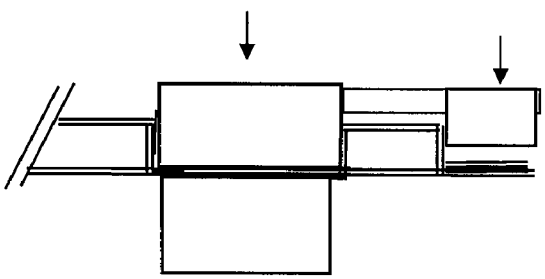

FIG. 4 illustrates another edge finish, in which the edge section 110 is folded in such a manner that parts of the bottom cover layer 16 are connected to one another. It will be understood that, in the case of FIG. 5, the reinforcing layer 70 may be omitted if desired. Usually, the construction will be fixed after folding by means of a consolidating mold which is, for example, slid around the formed angle or edge. The embodiments according to FIGS. 4 and 5 are particularly suitable for uses in which there is a very large load (mainly impact) on the outside of the edge, for example projecting and upright parts, which can come into contact with heavy objects.

Figure 8:
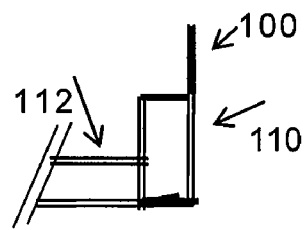
Figure 9:
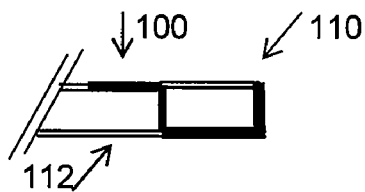
FIG. 9 shows another edge finish for a sandwich panel according to the invention.

FIGS. 6-9 illustrate another embodiment of a method for producing an edge finish. Starting from the situation in FIG. 1, not only is a recess 102 produced between the main body 112 and the edge section 110, but also the peripheral edge 100 of the edge section 110 can also be finished. Using a hot stamp 18, the top cover layer 14 is folded at the incision 50 and, using an edge molding stamp 18', at the peripheral edge 100 in the direction bottom cover layer 16, with the foam 12 beneath it being compacted. The edge section 110 is subsequently folded through 90°, so that an end product with the configuration illustrated in FIG. 8 is obtained. When the edge section 110 is folded back through 180° (see FIG. 9) instead of through 90°, a very flat edge is achieved, it being possible to connect the consolidated double cover layer of the reinforced peripheral edge to the top cover layer of the starting material by means of heat and pressure.

Figure 10:
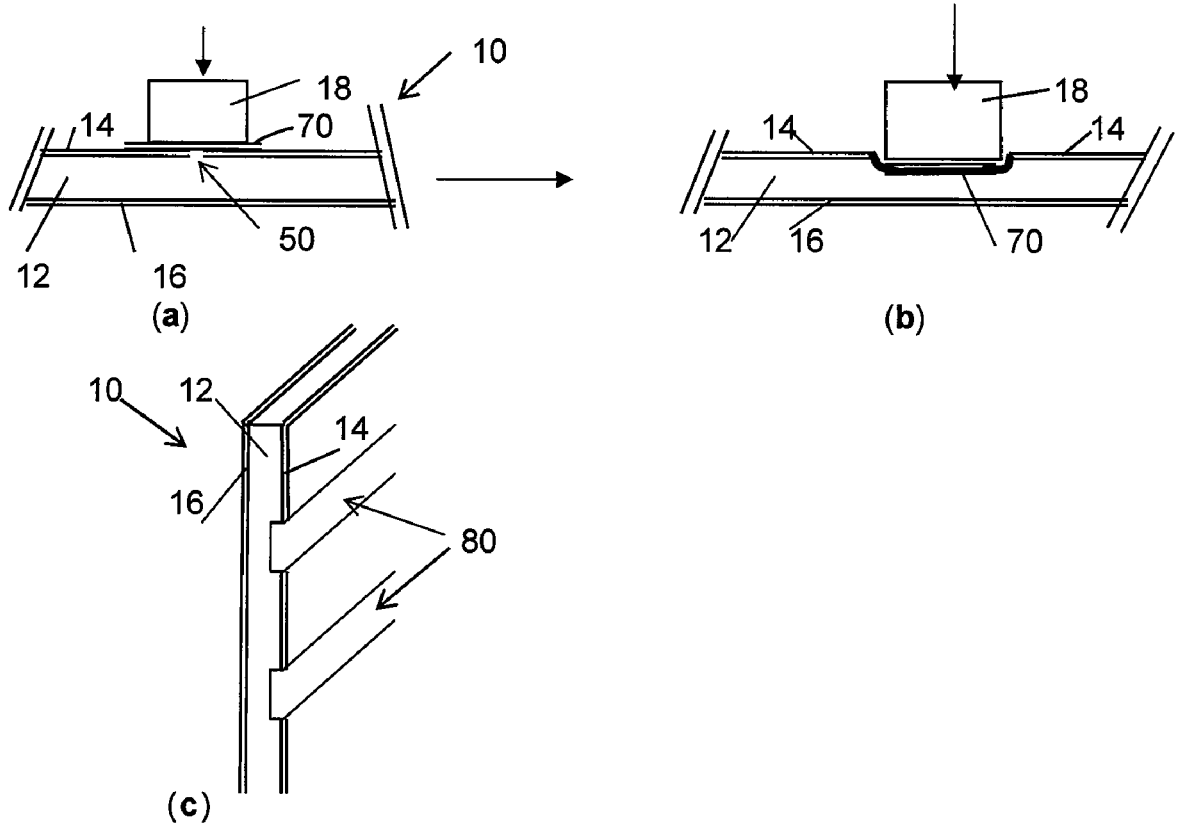
FIGS. 10(a)-(c) show another method for producing a composite panel having small recesses.

When a cover layer 14 cut with a folding line 50 and the foam 12 beneath it are deformed to a lesser depth, as is illustrated in FIG. 10(b), a local "thinned section" may be provided in the composite panel 10. In other words, a difference in thickness in the sandwich panel 10 can be achieved locally, while the recess is usually fully fiber-reinforced, by using the reinforcing layer 70. With the embodiment illustrated in FIG. 10(c), the sandwich panel 10 comprises slots 80 of a certain depth in the surface 14, into which other sandwich panels 10 with a thickness corresponding to the width of a slot 80 can readily be slid, for example for use in galley systems for airplanes, serving trays in trolleys, boards in cupboards, etc.

Figure 11:
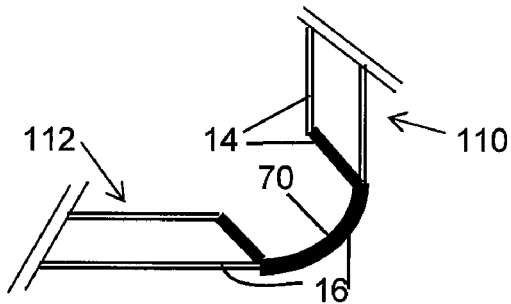
FIG. 11 shows an angled thermoplastic sandwich panel with a large radius.

FIG. 11 illustrates a sandwich panel 10, in which the angle between the main body 112 and edge section 110 is formed by the top fiber-reinforced thermoplastic cover layer 14, reinforcing layer 70, the core layer which has been pressed to form a solid or virtually solid core layer and bottom fiber-reinforced thermoplastic cover layer 16, which have been bent at a relatively low T to form a bend with a large radius.

Figure 12:
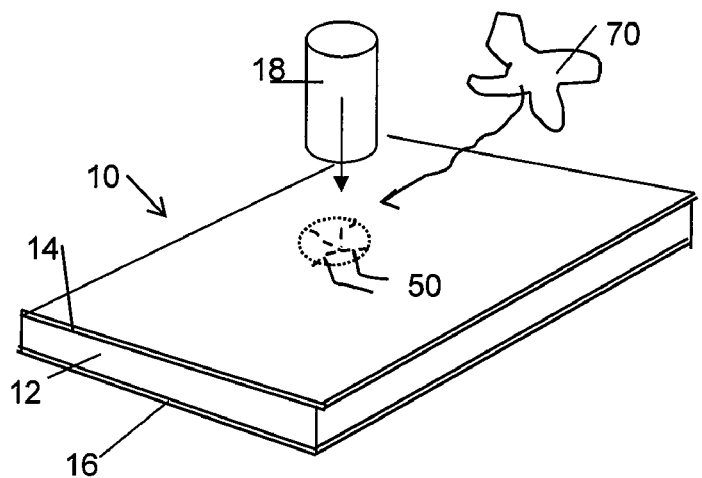
FIG. 12 diagrammatically shows a method for manufacturing a fiber-reinforced cylindrical hole.

FIG. 12 illustrates the application of the method according to the invention when producing a fiber-reinforced cylindrical hole. In a sandwich panel 10, radial incision lines 50 are made which intersect in the center of the hole to be formed. Subsequently, a reinforcing layer 70 having a star-shape is placed over the incisions 50. Subsequently, a cylindrical recess 102 is formed using a molding stamp 18 with circular cross section, the walls of which are reinforced by the edges of the incisions 50 and the reinforcing layer 70. This recess 102 can serve as securing hole for inserts and the like which are to be introduced.

Figure 13:
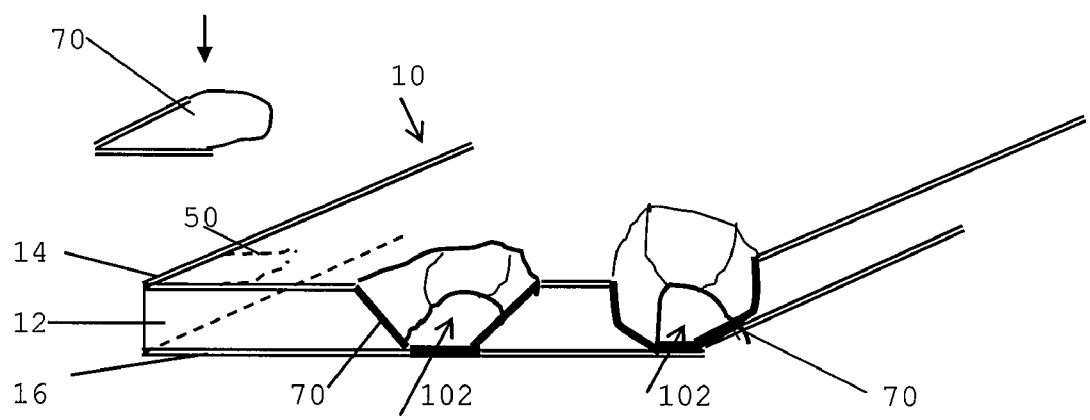
FIG. 13 diagrammatically shows a method for manufacturing a fiber-reinforced local recess in the edge of a composite panel.

FIG. 13 illustrates the application of the abovementioned method along the edge or on the angle of a composite panel, preferably a thermoplastic sandwich panel 10, in which incisions 50 are provided in the thermoplastic fiber-reinforced cover layer 14 in the direction of the angle so that excessive tensile stresses in the fiber structure are prevented. A reinforcing layer 70 is placed over the incisions 50, following which the recess 102 along the edge is produced using a deformation stamp (not shown) of the desired shape and the desired shape is consolidated using a consolidation stamp (not shown).

Figure 14:
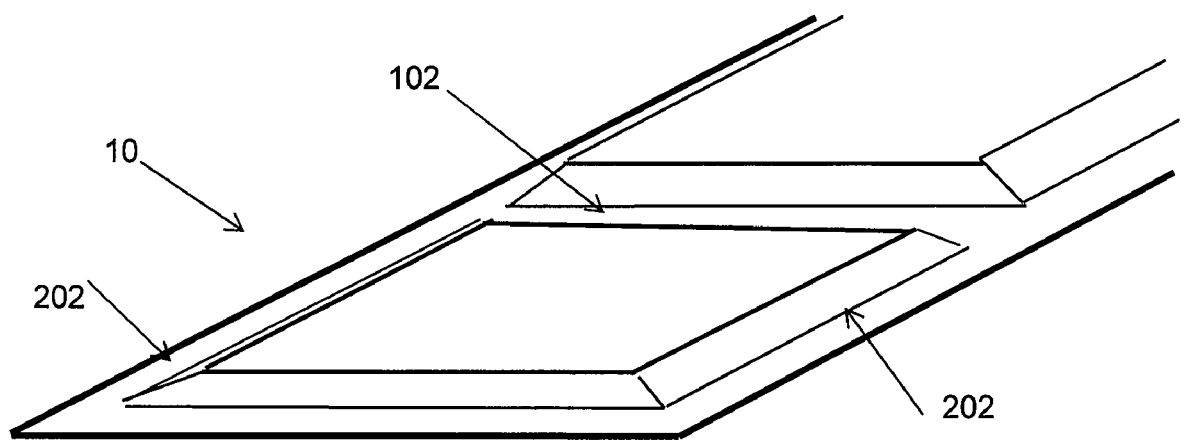
FIG. 14 shows a different embodiment of a decorative sandwich panel.

FIG. 14 shows a decorative thermoplastic sandwich panel 10, in which a fiber-reinforced recess 102 is provided between two elevated sections and a fiber-reinforced recess 202 situated along the periphery of the panel.

Figure 15:
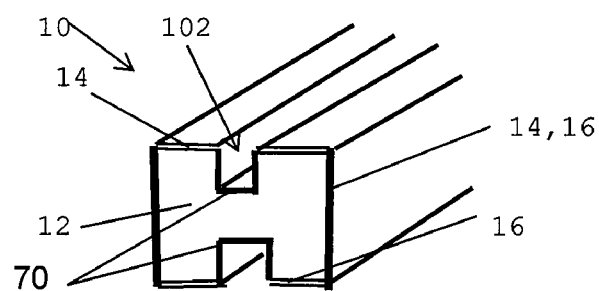
FIG. 15 shows an embodiment of a construction element according to the invention with a double groove-joining piece.

FIG. 15 shows a construction element in the shape of a connecting beam 10. This beam is made from a segment of thermoplastic foam 12 with a cover layer 14, 16 of a fiber-reinforced thermoplastic thereon on two sides. In both cover layers 14 and 16 and in foam 12 beneath it, once the relevant cover layer has been cut, recesses 102 are provided using a molding stamp and with the local interposition of an additional fiber-reinforced cover layer 70, so that the entire wall and bottom are composed of a fiber-reinforced thermoplastic material. Subsequently, the edges of the cover layers 14, 16 on the end sides are folded, so that the end sides are also covered with a fiber-reinforced thermoplastic layer.

What is claimed is:

1. A method for producing a composite construction element, which method comprises the steps of:
   a) providing a composite construction element, which comprises a thermoplastic core layer with at least one fiber-reinforced thermoplastic cover layer;
   b) providing an interruption in the fiber-reinforced thermoplastic cover layer of the element;

c) positioning a fiber-reinforced thermoplastic reinforcing layer over and/or near the interruption;

d) deforming at least the edges situated along the interruption by application of heat and pressure, so that a recess which is at least partially delimited by fiber-reinforced thermoplastic walls is obtained.

2. The method as claimed in claim 1, in which in step b) one or more parallel interruptions are provided at a predetermined distance from one another.

3. The method as claimed in claim 1, in which the core layer is locally compacted in step d).

4. The method as claimed in claim 1, in which the method furthermore comprises a consolidation step for consolidating the deformation.

5. The method as claimed in claim 1, in which deforming is carried out in step d) using a molding stamp having a temperature in the range from $0.80*Tm$-$1.20*Tm$, with Tm being the melting point.

6. The method as claimed in claim 1, in which a support stamp is used for supporting the uninterrupted cover layer having a temperature which is higher than or equal to the glass transition temperature of the thermoplastic of the fiber-reinforced thermoplastic cover layer.

7. The method as claimed in claim 1, in which the method also comprises a step of finishing a peripheral edge of the construction element, optionally while simultaneously locally compacting the core layer.

8. The method as claimed in claim 1, in which several interruptions are formed in step b), which optionally intersect.

9. The method as claimed in claim 1, in which an in-situ manufactured thermoplastic sandwich panel is provided in step a).

10. A method for producing a composite construction element according to claim 1, in which in step a) an interruption is provided at a predetermined distance from a peripheral edge of a construction element and in step d) an intermediate element with a main body is obtained, which is separated from an edge section by a recess, which extends in the thickness direction of the construction element, which recess is delimited by walls made of at least a fiber-reinforced thermoplastic layer; and the method furthermore comprises a step e) in which the edge section is bent with respect to the main body, so that a composite construction element having a reinforced angle or edge is obtained.

11. The method as claimed in claim 10, in which the core layer is locally compacted in step d).

12. The method as claimed in claim 10, in which the edge section is folded through 90° with respect to the main body in step e).

13. The method as claimed in claim 10, in which the edge section is folded through 180° with respect to the main body in step e).

14. The method as claimed in claim 10, in which the edge section is connected to the main body following step e).

15. The method as claimed in claim 10, in which the method furthermore comprises a consolidation step for consolidating the deformation.

16. The method as claimed in claim 10, in which deforming is carried out in step d) using a molding stamp having a temperature in the range from $0.80*Tm$-$1.20*Tm$, with Tm being the melting point.

17. The method as claimed in claim 10, in which a support stamp is used for supporting the uninterrupted cover layer having a temperature which is higher than or equal to the glass transition temperature of the thermoplastic of the fiber-reinforced thermoplastic cover layer.

18. The method as claimed in claim 10, in which the method also comprises a step of finishing a peripheral edge of the construction element, optionally while simultaneously locally compacting the core layer.

19. The method as claimed in claim 10, in which an in-situ manufactured thermoplastic sandwich panel is provided in step a).

20. The method as claimed in claim 10, in which the recess is filled with a filler segment which has a shape which complements the shape of the recess.

21. The method as claimed in claim 1, in which the core layer is not a solid material.

22. The method of claim 1, in which the core layer is a thermoplastic foam or a thermoplastic honeycomb.

23. The method of claim 1, in which the thermoplastic fiber-reinforced walls which at least partially delimit the recess are formed from the at least one fiber-reinforced cover layer or the fiber-reinforced thermoplastic reinforcing layer or both.

* * * * *